United States Patent
Blum

(10) Patent No.: US 11,137,626 B2
(45) Date of Patent: Oct. 5, 2021

(54) SYSTEMS, APPARATUS, AND METHODS FOR OPHTHALMIC LENSES WITH WIRELESS CHARGING

(71) Applicant: e-Vision Smart Optics, Inc., Sarasota, FL (US)

(72) Inventor: Ronald David Blum, Roanoke, VA (US)

(73) Assignee: e-Vision Smart Optics, Inc., Sarasota, FL (US)

(*) Notice: Subject to any disclaimer, the term of this patent is extended or adjusted under 35 U.S.C. 154(b) by 410 days.

(21) Appl. No.: 15/918,527

(22) Filed: Mar. 12, 2018

(65) Prior Publication Data

US 2018/0203260 A1    Jul. 19, 2018

Related U.S. Application Data

(63) Continuation of application No. PCT/US2016/052112, filed on Sep. 16, 2016.
(Continued)

(51) Int. Cl.
*G02C 11/00* (2006.01)
*G02C 7/04* (2006.01)
(Continued)

(52) U.S. Cl.
CPC ............... *G02C 11/10* (2013.01); *G01C 3/00* (2013.01); *G02C 7/04* (2013.01); *G02C 7/041* (2013.01);
(Continued)

(58) Field of Classification Search
CPC .......... G02C 11/10; G02C 7/04; G02C 7/101; G02C 7/061; H02J 7/025; H02J 50/12
(Continued)

(56) References Cited

U.S. PATENT DOCUMENTS 5,900,720 A    5/1999  Kallman
7,810,750 B2* 10/2010 Abreu .................... G02C 5/143
                                                   242/378.1
(Continued)

FOREIGN PATENT DOCUMENTS

CN    102972037 A    3/2013
CN    103888163 A    6/2014
(Continued)

OTHER PUBLICATIONS

Chinese Office Action and Translation Thereof in Chinese Patent Application No. 201680066848.1 dated Jan. 28, 2019, 26 pages.
(Continued)

*Primary Examiner* — Richard V Muralidar
(74) *Attorney, Agent, or Firm* — Smith Baluch LLP

(57) ABSTRACT

An ophthalmic device includes a lens and an electronic component embedded in the lens to enhance the functionality of the lens. The ophthalmic device includes a first coil to wirelessly receive energy from an external device, such as a wireless charger, and wirelessly transmits the received energy to a second coil coupled to the electronic component so as to power the electronic component. The first coil can function as part of a repeater to facilitate the wireless charging. The repeater can receive electrical energy wirelessly and works with various positions, sizes, and shapes of the electronic component. The wireless power efficiency can also be increased using the repeater to concentrate a magnetic flux within the second coil.

16 Claims, 12 Drawing Sheets

Related U.S. Application Data

(60) Provisional application No. 62/219,384, filed on Sep. 16, 2015.

(51) Int. Cl.
*H02J 50/12* (2016.01)
*G02C 7/10* (2006.01)
*G02C 7/08* (2006.01)
*G01C 3/00* (2006.01)
*H02J 7/02* (2016.01)
*H02J 7/34* (2006.01)

(52) U.S. Cl.
CPC ............ *G02C 7/083* (2013.01); *G02C 7/086* (2013.01); *G02C 7/101* (2013.01); *H02J 7/025* (2013.01); *H02J 50/12* (2016.02); *H02J 7/345* (2013.01)

(58) Field of Classification Search
USPC .......................................................... 320/108
See application file for complete search history.

(56) References Cited

U.S. PATENT DOCUMENTS

| | | | | |
|---|---|---|---|---|
| 8,857,983 | B2* | 10/2014 | Pugh | B29D 11/00038 351/159.39 |
| 8,944,590 | B2* | 2/2015 | Blum | G02C 7/101 351/113 |
| 9,100,097 | B2 | 8/2015 | Li et al. | |
| 10,200,087 | B2* | 2/2019 | Penttila | H02J 50/10 |
| 2006/0095128 | A1 | 5/2006 | Blum et al. | |
| 2009/0033863 | A1 | 2/2009 | Blum et al. | |
| 2009/0103044 | A1 | 4/2009 | Duston et al. | |
| 2010/0110368 | A1* | 5/2010 | Chaum | G02B 27/017 351/158 |
| 2010/0177277 | A1* | 7/2010 | Kokonaski | H02J 50/10 351/159.39 |
| 2011/0228212 | A1 | 9/2011 | Blum et al. | |
| 2012/0162600 | A1* | 6/2012 | Pugh | A61F 2/16 351/159.03 |
| 2012/0228958 | A1* | 9/2012 | Rakhyani | H01F 38/14 307/104 |
| 2013/0120706 | A1 | 5/2013 | Kakinuma et al. | |
| 2013/0194540 | A1* | 8/2013 | Pugh | G02C 7/04 351/159.03 |
| 2013/0285466 | A1* | 10/2013 | Wissenwasser | A61N 1/3787 307/104 |
| 2014/0327875 | A1* | 11/2014 | Blum | G02C 7/083 351/159.03 |
| 2015/0372532 | A1 | 12/2015 | Hatanaka et al. | |
| 2020/0218094 | A1* | 7/2020 | Howell | G02C 11/06 |

FOREIGN PATENT DOCUMENTS

| | | |
|---|---|---|
| DE | 201 03 525 U1 | 3/2003 |
| GB | 2 011 640 A | 7/1979 |
| JP | 2008537608 A | 9/2008 |
| JP | 2009080242 A | 4/2009 |
| JP | 2011515257 A | 5/2011 |
| JP | 2011125211 A | 6/2011 |
| JP | 2011232550 A | 11/2011 |
| JP | 2013099015 A | 5/2013 |
| JP | 2014161177 A | 9/2014 |
| WO | WO 99/01063 A1 | 1/1999 |
| WO | 2006107817 A2 | 10/2006 |
| WO | WO 2012/068527 A2 | 5/2012 |
| WO | WO 2014/184137 A1 | 11/2014 |

OTHER PUBLICATIONS

Extended European Search Report in European Patent Application No. 16847373.4 dated May 9, 2019, 9 pages.
Kim et al., "Eyeglasses-powered, contact lens-like platform with high power transfer efficiency." Biomedical microdevices 17.4 (2015): 75. 10 pages.
International Search Report and Written Opinion dated Feb. 3, 2017 for International Application No. PCT/US2016/052112, 11 pages.
Kim et al., "Eyeglasses-powered, contact lens-like platform with high power transfer efficiency," Biomed Microdevices, Jul. 7, 2015, [online] <URL: https://www.researchgate.net/profile/Jimin_Maeng/publication/279967809_Eyeglasses-powered_contact_lens-like_platform_with_high_power_transfer_efficiency/links/55a1e06e08ae1c0e046413c0.pdf>, 10 pages.
Senjuti, "Design and Optimization of Efficient Wireless Power Transfer Links for Implantable Biotelemetry Systems," The University of West Ontario, London, Ontario, Thesis, 2013, [online] <URL: http://ir.lib.uwo.ca/cgi/viewcontent.cgi?article=2482&context=etd>, 97 pages.
Japanese Office Action and English Translation Thereof In Japanese Patent Application No. 2018-514271 dated Mar. 29, 2021, 9 pages.

* cited by examiner

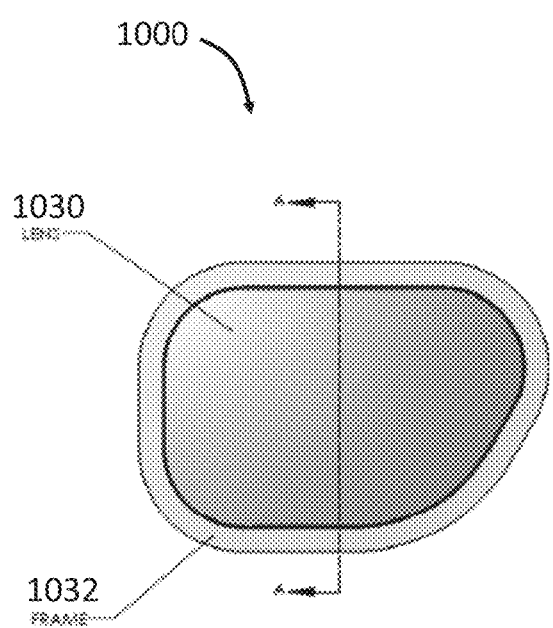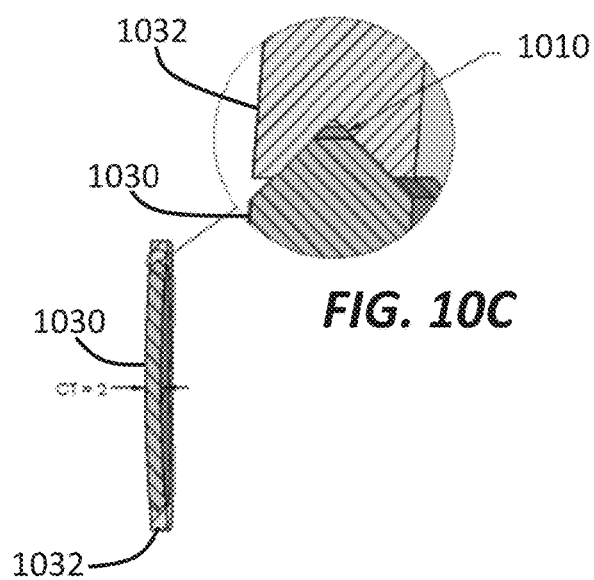
FIG. 10A  FIG. 10B  FIG. 10C

SYSTEMS, APPARATUS, AND METHODS FOR OPHTHALMIC LENSES WITH WIRELESS CHARGING

CROSS-REFERENCES TO RELATED APPLICATIONS

This application is a bypass continuation of International Application No. PCT/US2016/052112, filed Sep. 16, 2016, and entitled "Systems, Apparatus, and Methods for Ophthalmic Lenses with Wireless Charging," which in turn claims priority to U.S. Application No. 62/219,384, filed Sep. 16, 2015, entitled "ELECTRONIC OPTIC SYSTEM CAPABLE OF ACCEPTING WIRELESS ENERGY." Each of these applications is hereby incorporated herein by reference in its entirety.

BACKGROUND

Eyewear that includes functional electronics (also referred to as electronic eyewear) can provide advanced functionality to users. For example, a lens can include an electro-active material to form an electro-active lens. The electro-active material usually changes its refractive index or transmission in response to an electric voltage applied to the electro-active material. Therefore, the electro-active lens can dynamically adjust its optical power or transmission, controlled by the user or automatically triggered by environmental conditions such as the intensity of ambient light.

Electronic eyewear typically includes supporting electronics in the eyewear frame to provide electrical power and signals to support the operation of the functional electronics. The supporting electronics can include power suppliers, transformers, and filters, among others. In practice, integrating these supporting electronics into the eyewear frame often increases the size of the electronic eyewear, thereby affecting the appearance of the electronic eyewear. The supporting electronics may also reduce the comfort level to the user when wearing the electronic eyewear. In addition, supporting electronics that can be fitted into eyewear frames can be expensive and therefore can increase the total cost of the resulting electronic eyewear.

SUMMARY

Systems, apparatus, and methods described herein are directed to ophthalmic systems with wireless charging. In one example, an ophthalmic device includes a lens and a first coil, embedded in or affixed to the lens, to receive electrical energy wirelessly from an external device. The device also includes a second coil, embedded in the lens, to receive the electrical energy wirelessly from the first coil. An energy storage element is embedded in the lens and operably coupled to the second coil to store the electrical energy received by the second coil. The device further includes at least one electronic component, embedded in the lens and operably coupled to the battery, to consume at least a portion of the electrical energy stored by the energy storage unit.

In another example, a method of operating an ophthalmic device is disclosed. The ophthalmic device includes a lens and at least one electronic component embedded in the lens. The method includes receiving electrical energy wirelessly from an external device using a first coil coupled to the lens and transmitting the electrical energy wirelessly from the first coil to a second coil embedded in the lens. The method also includes storing the electrical energy received by the second coil into an energy storage element and operating the at least one electronic component using at least a portion of the electrical energy stored by the energy storage element.

In yet another example, spectacles includes spectacle frames and a lens disposed in the spectacle frames. The spectacles also include a coil, disposed about a perimeter of the lens, to receive electrical energy wirelessly from an external device. An insulator is disposed between the coil and an electronic component to insulate the coil from the electronic components. A second coil is embedded in the lens to receive the electrical energy wirelessly from the first coil. The spectacles also include a battery, embedded in the lens and operably coupled to the second coil, to store the electrical energy received by the second coil. The spectacles further include the electronic component, embedded in the lens and operably coupled to the battery, to consume at least a portion of the electrical energy stored by the power supply.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTION OF THE DRAWINGS

The skilled artisan will understand that the drawings primarily are for illustrative purposes and are not intended to limit the scope of the inventive subject matter described herein. The drawings are not necessarily to scale; in some instances, various aspects of the inventive subject matter disclosed herein may be shown exaggerated or enlarged in the drawings to facilitate an understanding of different features. In the drawings, like reference characters generally refer to like features (e.g., functionally similar and/or structurally similar elements).

FIGS. 10A-10D illustrate an ophthalmic system including a repeater coil and a battery disposed between a lens and a lens frame.

DETAILED DESCRIPTION

Ophthalmic Devices with Wireless Charging

To address the challenges in conventional electronic eyewear of integrating supporting electronics into the eyewear frame, systems, apparatus, and methods described herein employ a wireless energy transfer approach to power the functional electronics in electronic eyewear. In this approach, an ophthalmic device includes a lens and an electronic component disposed in or on the lens to enhance the functionality of the lens. The ophthalmic device includes a first coil to wireless receive energy (or power) from an external device (e.g., a wireless charger) and wirelessly transmits the received energy (or power) to a second coil coupled to the electronic component so as to power the electronic component.

The first coil can function as part of a repeater to facilitate the wireless charging. An ophthalmic device with a repeater can be wirelessly charged regardless of positions, sizes, shapes, and number of power-consuming elements in the ophthalmic device. In addition, the wireless power efficiency can be increased by using the repeater to concentrate a magnetic flux.

Compared to conventional electronic eyewear, ophthalmic devices described herein may have fewer components, and the components in the device can also be smaller in size, thereby making the entire device more compact. The electronic components in the device are powered independent of the eyewear frame without bulky electronic components attached to the eyewear frames, thereby maintaining the aesthetic appearance of the eyewear.

Figure 1:
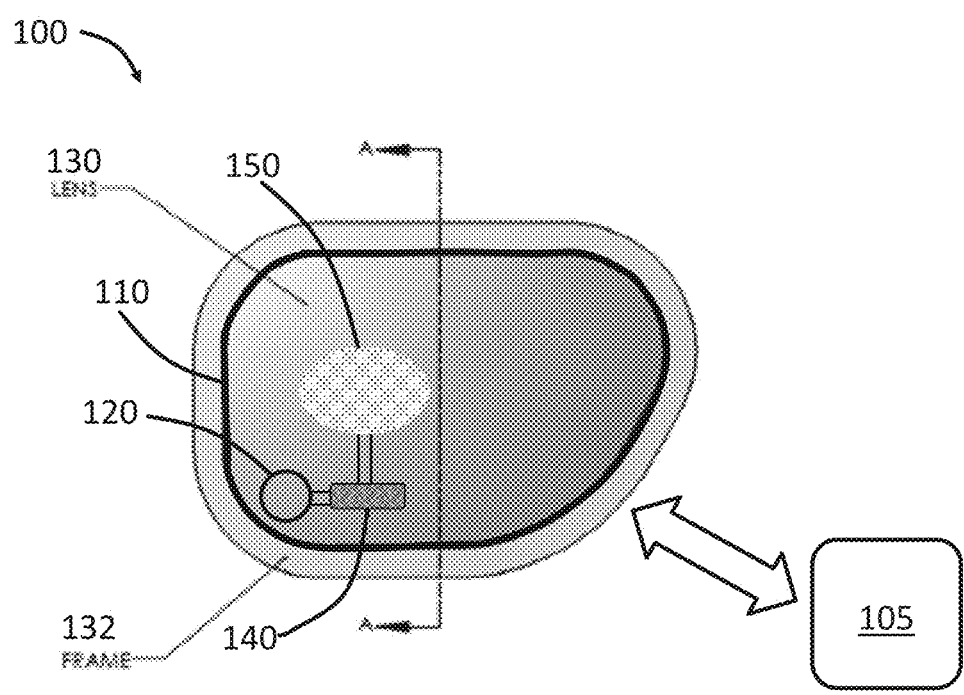
FIG. 1 shows a schematic of an ophthalmic system with wireless charging.

FIG. 1 shows a schematic of an ophthalmic device 100 with wireless charging. The device 100 includes a lens 130 disposed in a lens frame 132 and an electronic component 150 disposed in the lens 130. A first coil 110 is attached to the lens 130 to receive wireless energy or power from an external device 105. A second coil 120 is attached to the lens 130 to receive wireless energy or power from the first coil 110 and transmits the received energy to an energy storage unit 140 (also referred to as an energy storage element 140). The energy storage unit 140 provides at least part of the power for the electronic component 150.

The first coil 110 as shown in FIG. 1 is disposed between the lens 130 and the lens frame 132. In another example, the first coil 110 can be embedded in or affixed to the lens 130. In this case, the first coil 110 can be made of transparent conductive material such as transparent conductive oxide (TCO). Alternatively, the first coil 110 can be disposed around a periphery of the lens 130 (i.e., substantially close to the lens frame 132) so as to reduce interference with the wearer's vision. In yet another example, the first coil 110 can be around the thickness of the lens 130 (see, e.g., FIG. 8). In yet another example, the first coil 110 can be disposed on the front or back surface of the lens 130.

In yet another example, the first coil 110 can be integrated into the lens frame 132. For example, the lens frame 132 can include hollow tubes and the first coil 110 can be disposed within the hollow tubes. In yet another example, the first coil 110 can be disposed at the front or back surface of the lens frame 132.

The first coil 110 can communicate with the external device 105 in various ways. In one example, the first coil 110 receives energy from the external device 105, which can be a wireless charger or any other device that can transmit wireless energy. In another example, the first coil 110 can receive control signals from the external device 105 so as to control the operation of the electronic component 150. In yet another example, the first coil 110 can receive data from the external device 105. In this case, the external device 105 can include a controller, a processor, a smartphone, a computer, a laptop, a tablet, or any other appropriate devices with a wireless transmitter.

The first coil 110 can also transmit signals to the external device 105. For example, the first coil 110 can transmit operating data of the electronic component 150 to the external device 105, which can analyze the operating data and provide control signals based on the operating data of the electronic component 150. In another example, the first coil 110 can transmit status information about the energy storage unit 140 to the external device 105. In response to an indication of low energy storage, the external device 105 can initiate the charging process to charge the energy storage unit 140.

Alternatively, the charging of the energy storage unit 140 can be automatic. For example, as long as the external device 105 and the first coil 110 are within a threshold distance, the charging process can start. The threshold distance can be about 5 cm or greater (e.g., about 5 cm, about 10 cm, about 20 cm, about 50 cm, about 1 meter, about 2 meters, about 5 meters, about 10 meters, about 20 meters, about 50 meters or greater, including any values and sub ranges in between). The charging can also be either continuous or periodic. Alternatively, the threshold distance can also be less than 5 cm. For example, the external device 105 can include a docking station (also referred to as a dock) to receive and secure the first coil 110 (and the lens 130) for charging.

The communication between the first coil 110 and the external device 105 can be carried out using various technologies. In one example, the first coil 110 and the external device 105 can be inductively coupled. In this case, the external device 105 can transmit energy to the first coil 110 via inductive charging.

In another example, the external device 105 and the first coil 110 can be resonantly coupled. For example, the external device 105 can function as a resonant transformer to transmit energy to the first coil 110 via magnetic resonance power transfer technology. Magnetic resonance power transfer is transmission of electrical energy between two coils that are tuned to resonate at the same frequency. Without being bound by any particular theory of mode of operation, based on the principles of electromagnetic coupling, resonance-based chargers can inject an oscillating current into a highly resonant coil (e.g., a coil included in the external device 105) to create an oscillating electromagnetic field. Another coil (e.g., the first coil 110) with the same resonant frequency can receive power from the electromagnetic field and convert the power back into electrical current that can be used to power the electronic component 150 and/or charge the energy storage unit 140.

Resonance charging can offer unique advantages in spatial freedom, allowing the external device 105, which is also referred as the resonance charger, to be separated from the first coil 110. Magnetic resonance wireless transfer is a non-radiative mode of energy transfer, relying instead on the magnetic near field. Magnetic fields usually interact weakly with biological organisms, including people and animals, and therefore are regarded as safe for biological application.

In one example, the first coil 110 and the external device 105 are coupled using via near field resonant coupling. In this case, the distance between the external device 105 and the first coil 110 can be substantially equal to or less than 5 times the diameter of the first coil 110. Near field resonant coupling can have high efficiency, which can depend on preset angle and/or orientations of the first coil 110 and the transmitting coil included in the external device 105.

In another example, the first coil 110 and the external device 105 are coupled using via mid-field resonant coupling, in which the distance between the external device 105 and the first coil 110 can be about 5 times to about 1000 times of the diameter of the first coil 110. Power transmission efficiency in mid-field resonant coupling can depend on the preset relative angular orientation of between the first coil 110 and the transmitting coil included in the external device 105.

In yet another example, the first coil 110 and the external device 105 are coupled using via far-field resonant coupling, in which the distance between the external device 105 and the first coil 110 is greater than 1000 times of the diameter of the first coil 110. Far-field resonant coupling can be less sensitive to the angle orientation of between the first coil 110 and the transmitting coil included in the external device 105. The two coils (first coil 110 and the transmitting coil in the external device 105) can be impedance matched to increase the transmission efficiency. For example, the shapes, dimensions, and resistances of the two coils 110 and 120 can be configured to achieve impedance matching.

Other than non-resonant and resonant induction charging, other techniques can also be used to transfer energy from the external device 105 to the first coil 110. In one example, the first coil 110 can receive energy using radio frequency identification (RFID) technology, which allows the external device 105 to transmit energy to the first coil 110 via RF waves. RFID technology also allows the external device 105 to transmit and read data to and from the first coil 110. In another example, the external device 105 can transmit energy to the first coil via microwaves. In yet another example, the external device 105 can transmit energy to the first coil via ultrasound waves.

In yet another example, the external device 105 can communicate with the first coil 110 via WiFi signals. In yet another example, the external device 105 can communicate with the first coil 110 via Bluetooth signals. In these cases, the communications between the external device 105 and the first coil 110 can be two-way, i.e., the first coil 110 can also transmit data to the external device 105.

The first coil 110, in response to receiving the electrical energy from the external device 105, excites and energizes the second coil 120 so as to transfer the electrical energy to the second coil 120. In this manner, the first coil 110 can function as a repeater or part of a repeater to relay the electrical energy from the external device 105 to the second coil 120. In one example, the energy transfer between the first coil 110 and the second coil 120 can be achieved using non-resonant inductive charging. Since the first coil 110 is usually in the proximity of the second coil 120, the efficiency of this induction charging can be high. In another example, the energy transfer between the first coil 110 and the second coil 120 can be achieved using resonant charging as described above. Other than transferring energy, the first coil 110 can also function as an antenna to transmit controls signals or data to the second coil 120.

In one example, the first coil 110 is disposed away from the lens 130. For example, the first coil 110 can be disposed on the lens frame 132. In another example, the first coil 110 can be disposed on the temple portion of the lens frame 132. In yet another example, the first coil 110 can be disposed on the eye wire portion of the lens frame 132. In these cases, the second coil 120 can be disposed in or on the lens 130 and is electrically coupled to the electronic component 150 to power the electronic component 150 (e.g., the energy storage element 140 can be optional here). The second coil 120 can be also connected to a controller (not shown in FIG. 1) to control the voltage transmitted to the electronic component 150. The controller can also control the modulation, frequency, power, and/or other parameters of the signals sent to the electronic component. In yet another example, the external device 105 controls the voltage, power, frequency, and other parameters of signals (including energy) transmitted to the first coil 110. In this case, the number of components included in the lens 130 or the lens frame 132 can be reduced.

FIG. 1 shows that the first coil 110 and the second coil 120 each include a single loop. Alternatively, each of the first coil 110 and the second coil 120 can include multiple loops. In one example, the multiple loops are formed by the same conductive wire. In another example, the multiple loops are formed by multiple wires and can be substantially concentric with each other.

In one example, the lens 130 can have optical power. In another example, the lens 130 can have no optical power. In this case, the device 100 can be used in applications such as virtual reality (VR), augmented reality (AR), mixed reality (MR), and eye protection, among others.

The energy storage element 140 can use various techniques to store energy provided by the second coil 120. In one example, the energy storage unit 140 includes a battery, such as a rechargeable battery. Due to convenient recharging using the wireless energy transfer techniques described above, the battery used in the device 100 can have a small size. For example, the lateral dimension (e.g., length) of the battery can be less than 2.5 cm (e.g., less than 2.5, less than 2 cm, less than 1.5 cm, less than 1 cm, less than 8 mm, or less than 5 mm, including any values and sub ranges in between). The rechargeable battery can use a thin film battery (e.g., thin film lithium ion battery) to achieve a small form factor of the device 100.

In another example, the energy storage element 140 can include a capacitor. In yet another example, the energy storage unit 140 can include a supercapacitor, also referred to as an ultra-capacitor. The supercapacitor can store up to 15-35 Watt hour of electrical energy per kilogram of its weight.

In FIG. 1, the energy storage element 140 is disposed away from the electronic component 150. In another example, the energy storage element 140 can be disposed within the electronic component 150. In yet another example, the energy storage element 140 can be disposed on the lens frame 132. In yet another example, the energy storage element 140 can be disposed along a periphery of the lens 130. In yet another example, the energy storage element 140 can be disposed along a periphery of the electronic component 150. In yet another example, the energy storage element 140 can be disposed substantially parallel to the first coil 110 (see, e.g., FIGS. 10A-10D). An insulating layer can be disposed between the first coil 110 and the energy storage unit 140.

The electronic component 150 in the device 100 can improve the function of the lens 130 or add additional functions to the lens 130. For example, the electronic component 150 can include an electro-active element made of an electro-active material such as liquid crystal. As understood in the art, certain liquid crystal materials change their refractive index in response to an applied voltage. When combined with the lens 130, the change of the refractive index in the electro-active element can change the total optical power of the device 100, thereby allowing dynamic adjustment of optical power by the wearer. More information about electro-active elements can be found in U.S. Pat. No. 9,155,614, which is hereby incorporated by reference in its entirety.

In another example, the electronic component 150 can include an electro-active element, which changes its transmission in response to a voltage applied over the electro-active element. The change of the transmission can be broadband, in which case the electro-active element can function as a neutral filter. Alternatively, the change of transmission can be narrowband and the electro-active element can accordingly function as a passband filter, which transmits light at one or more wavelengths but not at other wavelengths.

In yet another example, the electronic component 150 can include one or more sensors (see, e.g., FIG. 7 and FIG. 8 below). For example, the electronic component 150 can include an accelerometer to monitor the motion of the wearer. In another example, the electronic component 150 can further include a photo detector, which can detect ambient light. The detection of acceleration or the ambient light can be used to control the refractive index or transmission of the electro-active element. In yet another example, the electronic component 150 can further include a ultra-violet (UV) sensor to detect the level of UV radiation. In response to a high level of UV light, the device 100 can decrease the transmission of UV light so as to protect eyes of the wearer.

In yet another example, the electronic component 150 can further include a range finder to measure distance between the wearer and an object of interest. This distance can be used to control the optical power (also referred to as focal length) of the device 100. In yet another example, the electronic component 150 can further include an inter-pupil distance sensor to measure the distance between the two pupils of the wearer. The electronic component 150 can increase or decrease the optical power in response to the inter-pupil distance of the wearer. In yet another example, the electronic component 150 can further include a thermo-sensor to measure temperature, such as ambient temperature.

The electronic component 150 can further include one or more circuits such as application specific integrated circuits (ASICs) to control the device 100. In another example, the electronic component 150 can include circuits for frequency modulation and de-modulation. This circuit can allow the first coil 110 and/or the second coil 120 to receive and transmit modulated signals. In yet another example, the electronic component 150 can further include one or more resonance circuits to transmit and receive signals. The electronic component 150 can further include a data storage unit, such as a memory. The electronic component 150 can also include a buffer to facilitate data management.

The device 100 can be used in various applications. In one example, the device 100 can be used in spectacle lenses. In another example, the device 100 can be used in electronic contact lenses, in which case the lens frame 132 can be made of a soft material, such as a hydrogel. In yet another example, the device 100 can be used in electronic instrument lenses. In yet another example, the device 100 can be used in electronic diagnostic lenses. In yet another example, the device 100 can be used in electronic security lenses. In yet another example, the device 100 can be used in electronic camera lenses.

In yet another example, the device 100 can be used in electronic lenses associated with health care. In yet another example, the device 100 can be used in electronic lenses associated with manufacturing (e.g., in protection goggles). In yet another example, the device 100 can be used in electronic lenses associated with bar code scanning (e.g., the electronic component 150 can include a bar code reader). In yet another example, the device 100 can be used in electronic lenses associated with inspection. In yet another example, the device 100 can be used in communications (e.g., video call or video conference). In yet another example, the device 100 can be used in electronic lenses associated with transportation (e.g., the electronic component 150 can provide drive directions to drivers).

Figure 2:
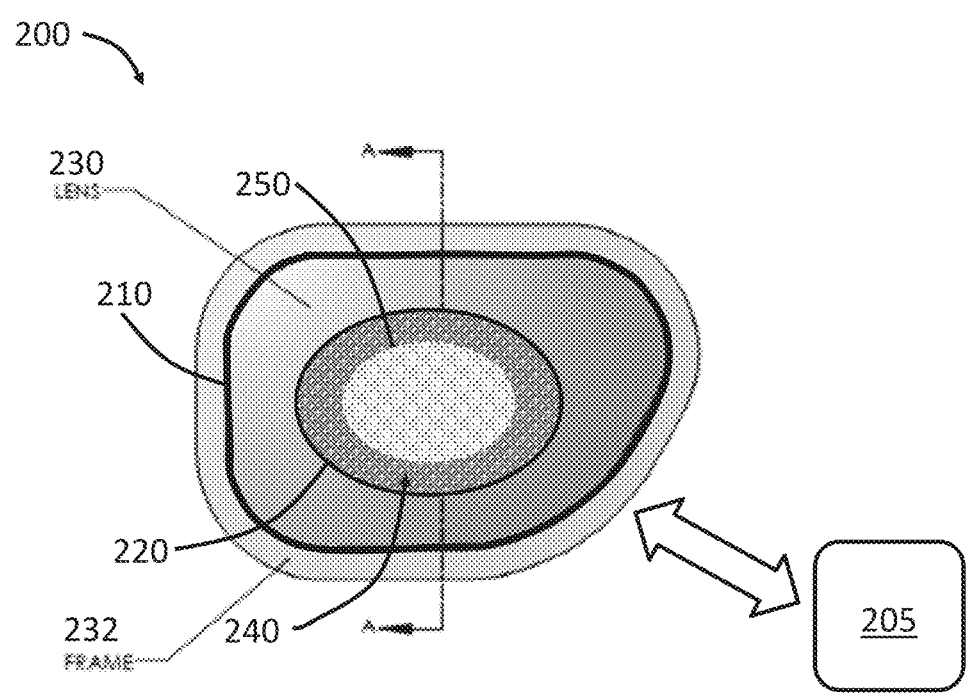
FIG. 2 shows a schematic of an ophthalmic system with wireless charging and a thin film battery for energy storage.

FIG. 2 shows a schematic of an ophthalmic system 200 with wireless charging and a thin film battery for energy storage. The system 200 includes a lens 230 disposed within a lens frame 232. An electronic component 250 is coupled to the lens 230 to improve functionality of the device 200. The system 200 includes a first coil 210 to receive electrical power from an external device 205. The received energy is transmitted to a second coil 220 via, for example, induction charging. A thin film battery 240 (also referred to as a power band) is disposed substantially around the electronic component 250 to store the electrical energy received by the second coil 220 and provide power to the electronic component 250.

The thickness of the thin film batter 240 can be less than 2 mm (e.g., less than 2 mm, less than 1.5 mm, less than 1 mm, less than 900 µm, less than 800 µm, less than 700 µm, less than 600 µm, less than 500 µm, less than 400 µm, or less than 300 µm, including any values and sub ranges in between). Therefore, the device 200 can have a substantially smooth surface and almost any desired form factor. The thin film battery 240 can be embedded into the lens 230. Alternatively, the thin film battery 240 can be disposed on the front surface or the back surface of the lens 230.

Figure 3:
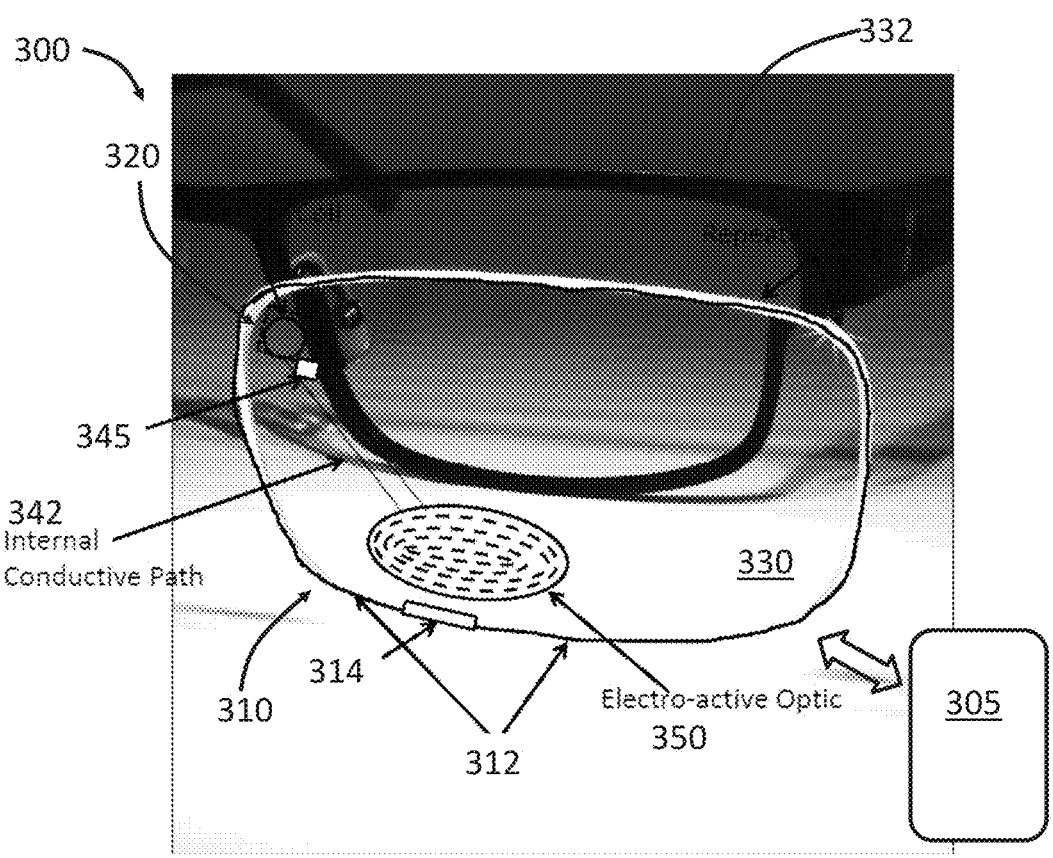
FIG. 3 shows a schematic of an ophthalmic system with a repeater coil for wireless charging.

FIG. 3 shows a schematic of an ophthalmic system 300 with a repeater for wireless charging. The system 300 includes a lens frame 332 to hold a lens 330. A first coil 312 is disposed between the lens 330 and the lens frame 332 to receive wireless energy from an external device 305. A repeater component 314 is operably coupled to the first coil 312 to form a repeater 310 so as to facilitate wireless energy transfer between the first coil 310 and the external device 305. A second coil 320 is coupled to the lens 330 to receive electrical energy transmitted by the first coil 310 and transmit the received energy to an electronic component 350 (e.g., an electro-active element) via an internal electronic component 345 and a conductive path 342.

The system 300 can be configured as a spectacle lens or a pair of spectacles for a wearer. The conductive path 342 can be made of transparent conductive materials to reduce potential interference with the wearer's vision. The second coil 320 shown in FIG. 3 is disposed at a corner of the lens 330. Alternatively, the second coil 320 can be disposed at a periphery of the electronic component 350 and can be substantially concentric with the first coil 312 so as to increase the efficiency of wireless energy transfer. In this case, the second coil 320 can also be made of transparent conductive materials.

The system 300 can further include an optional energy storage element (not shown) to store energy received by the second coil 320. Alternatively, the system 300 can include no energy storage element, and the electronic component 350 is directly powered by the second coil 320. In this case, the external device 305 can provide continuous charging to the first coil 310 to allow continuous operation of the electronic component 350.

Figure 4:
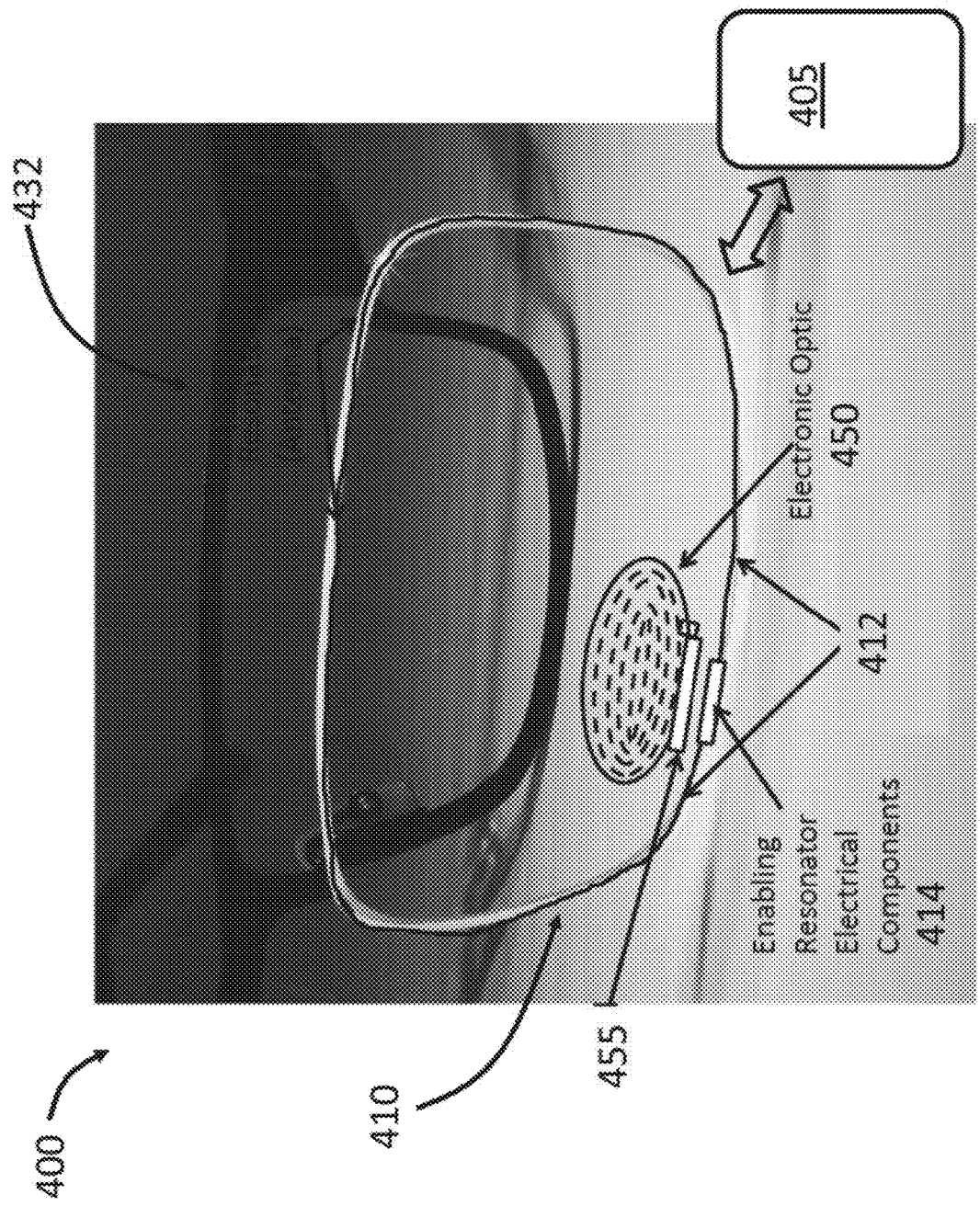
FIG. 4 shows a schematic of an ophthalmic system with a resonator coil for wireless charging.

FIG. 4 shows a schematic of an ophthalmic system 400 with a resonator for wireless charging. The system 400 includes a lens frame 432 to hold a lens 430. A first coil 412 is disposed along the periphery of the lens 430 to receive wireless energy from an external device 405. A resonator electronic 414 is operably coupled to the first coil 412 to form a resonator 410, which can increase the efficiency of energy transfer between the first coil 410 and the external device 405. An electronic component 450 is coupled to the lens 430 and is powered by the resonator 410 via an internal electronic 455. Placing the resonator electronic 414 and the internal electronic 455 close to each other can improve energy transfer.

Figure 5:
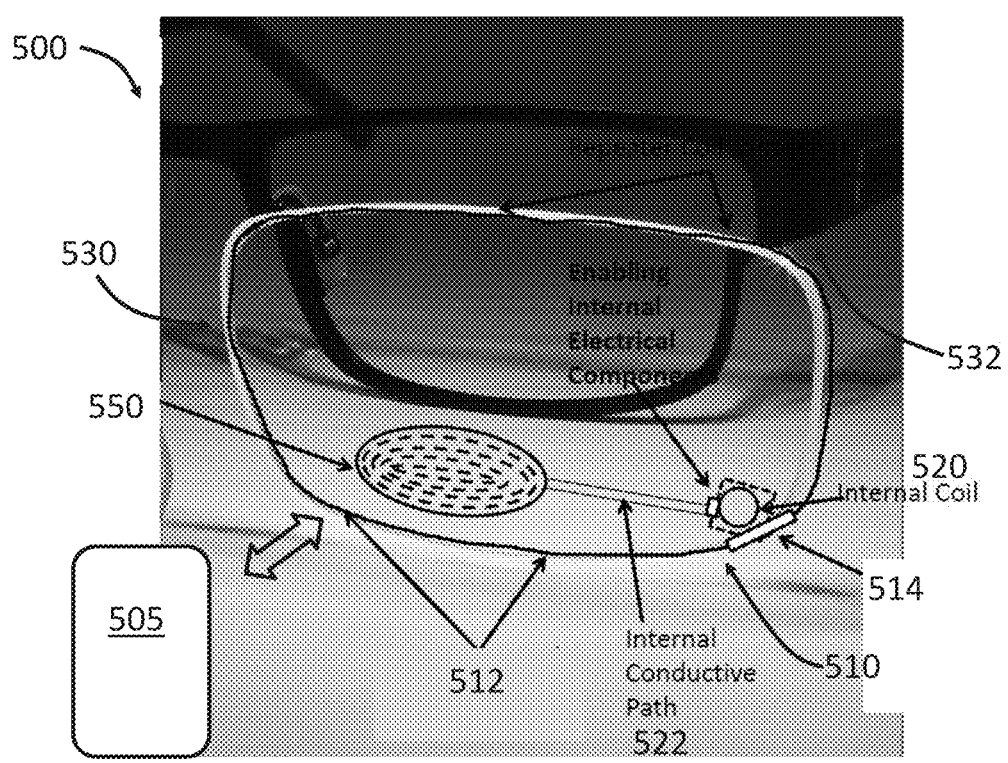
FIG. 5 shows a schematic of an ophthalmic system with non-resonant coupling between an internal coil and a repeater coil.

FIG. 5 shows a schematic of an ophthalmic system 500 with non-resonant coupling between an internal coil 520 (also referred to as a second coil) and a repeater coil 512 (also referred to as the first coil 512). The system 500 includes an external device 505 to wirelessly transmit electrical energy to the first coil 512, which is disposed between a lens 530 and a lens frame 532. A repeater electronic component 514 is coupled to the first coil 512 to form a repeater 510 so as to facilitate energy transfer between the first coil 512 and the external device 505. The second coil 520 is disposed in the close proximity of the repeater electronic component 514 to receive energy from the first coil 512. A conductive path 522 is disposed on or into the lens 530 to conduct the power from the second coil 520 to an electronic component 550.

Figure 6:
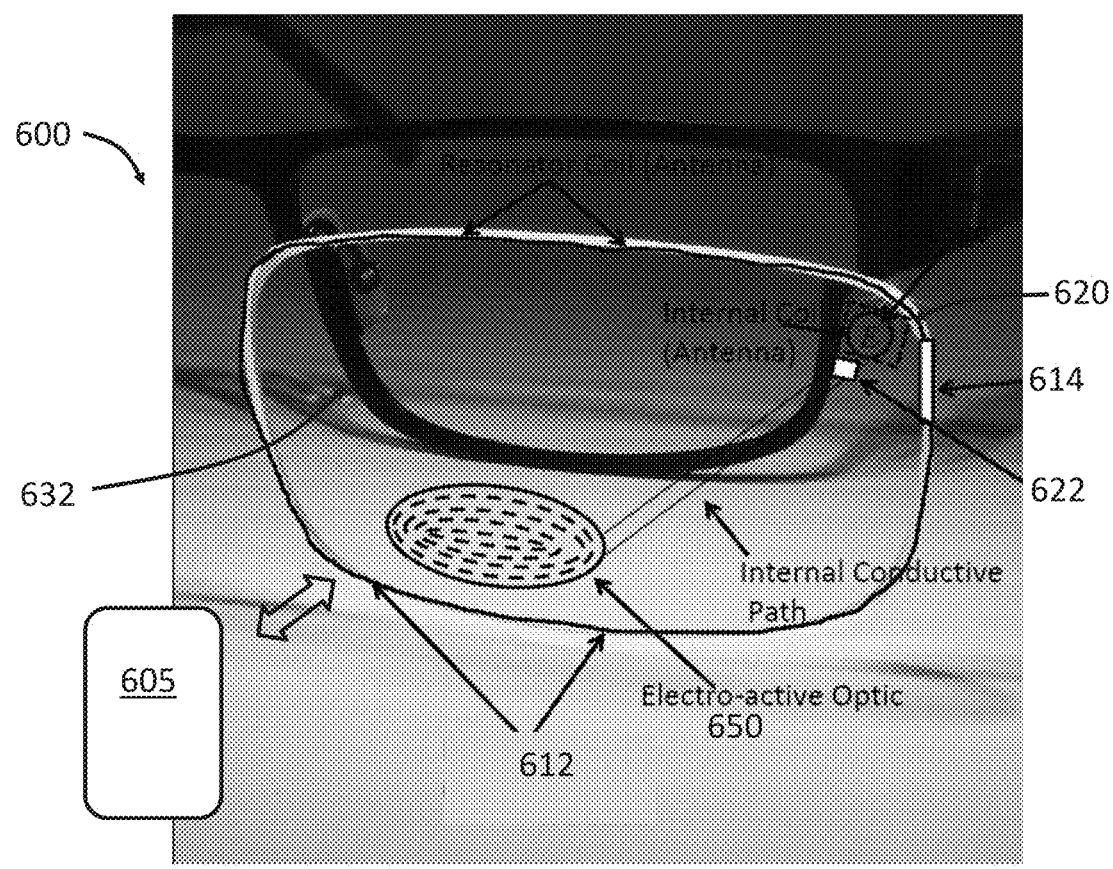
FIG. 6 shows a schematic of an ophthalmic system with non-resonant coupling between an internal coil and a resonator coil.

FIG. 6 shows a schematic of an ophthalmic system 600 with non-resonant coupling between an internal coil 620 and a resonator coil 612. The system 600 includes a lens 630 disposed within a lens frame 632. A first coil 612 is sandwiched between the lens 630 and the lens frame 632 to receive wireless energy from an external device 605. A resonator electronic 614 is coupled to the first coil 612 to form a resonator 610, which transmits the energy received by the first coil 612 to a second coil 620. The second coil 620 and the resonator electronic 614 are disposed in close proximity to each other to increase energy transfer efficiency. The second coil 620 further transmits the electrical energy to an electronic component 650 via an internal electronic 622.

Figure 7:
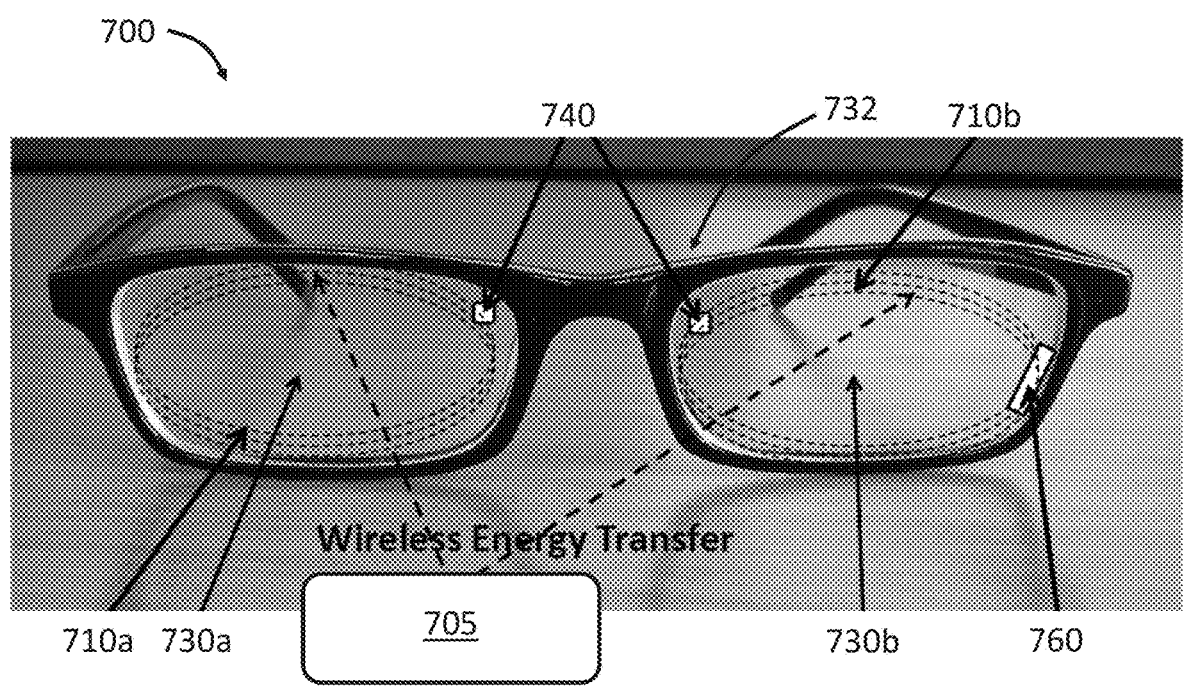
FIG. 7 shows a schematic of a pair of spectacle lenses with wireless charging.

FIG. 7 shows a schematic of a pair of spectacles 700 with electronic components that can be powered by wireless charging. The spectacles 700 include a pair of lenses 730a and 730b disposed in a lens frame 732. Each lens 730a and 730b includes electronic components (not shown in FIG. 7) such as electro-active elements as described above. A first group of coils 710a is coupled to or embedded in the first lens 730a and a second group of coils 710b is coupled to or embedded in the second lens 730b. The two groups of coils 710a and 710b are configured to receive wireless energy from an external device 705. The spectacles 700 also include two energy storage units 740, each of which is coupled to a respective group of coils 710a and 710b. The energy storage units 740 can include internal coils to receive energy from the coils 710a and 710b, in which case the coils 710a and 710b can function as repeaters and/or resonators. The system 700 further includes a sensor 760 that is operably coupled to the coils 710b. The sensor 760 can include any of the sensors described above, including an accelerometer, a photo detector, a UV detector, a thermo-sensor, a range finder, or a combination thereof.

Each of the two groups of coils 710a and 710b, as shown in FIG. 7, includes three loops. The three loops can be formed by one or more wires. Other numbers of loops can also be used in the coils 710a and 710b. For example, each of the two groups of coils 710a and 710b can includes more than three loops (e.g., more than 3, more than 5, more than 10, more than 15, or more than 20, including any values and sub ranges in between). In one example, the two groups of coils 710a and 710b include the same number of loops. In another example, the two groups of coils 710a and 710b include different numbers of loops so as to power, for example different electronic devices in each lens (730a or 730b).

Figure 8:
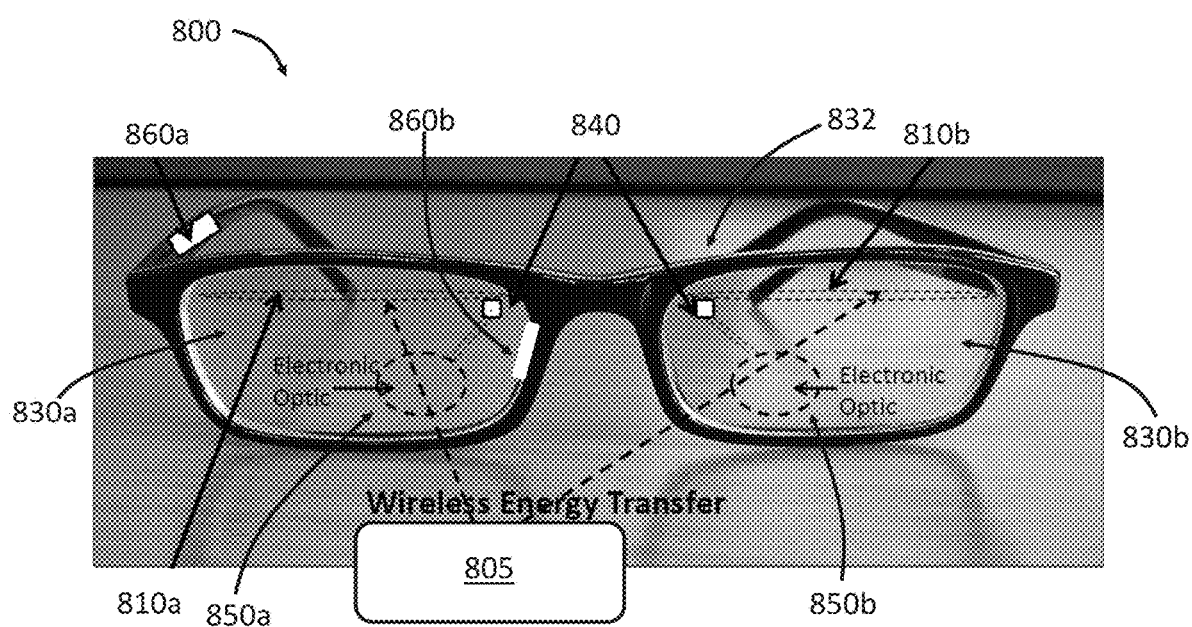
FIG. 8 shows a schematic of a pair of spectacle lenses with wireless charging using coils around the thickness of the lenses.

FIG. 8 shows a schematic of a pair of spectacle 800 with wireless charging using coils 810a and 810b around the thickness of each lens (i.e., in a plane containing or parallel to the corresponding lens's optical axis). The spectacles 800 include a pair of lenses 830a and 830b disposed in a lens frame 832. Each of the two lenses 830a and 830b includes a respective coil 810a and 810b to receive energy from an external device 805 so as to power a respective electronic optic 850a and 850b. The spectacles 800 also include one or more energy storage elements 840 to store energy received by the coils 810a and 810b. The energy storage elements 840 can include internal coils (not shown in FIG. 8) to receive energy from the coils 810a and 810b via, for example, non-resonant or resonant inductive charging.

The spectacles 800 further include a first sensor 860a disposed on the temple portion of the lens frame 832 and a second sensor 860b disposed on the eye wire portion of the lens frame 832. The two sensors can include any of the sensors described above. In addition, additional sensors may also be included in the spectacles 800. The additional sensors can be disposed at any appropriate locations, including on the eye wire, on the lens, embedded into the lens, and on the bridge portion of the lens frame 832, among others.

The coils 810a and 810b are disposed on an upper portion of the respective lens 830a and 830b. The coils 810a and 810b are formed around the thickness of the lenses 830a and 830b, instead of along the periphery of the lenses as seen in, for example, FIG. 7.

Figure 9:
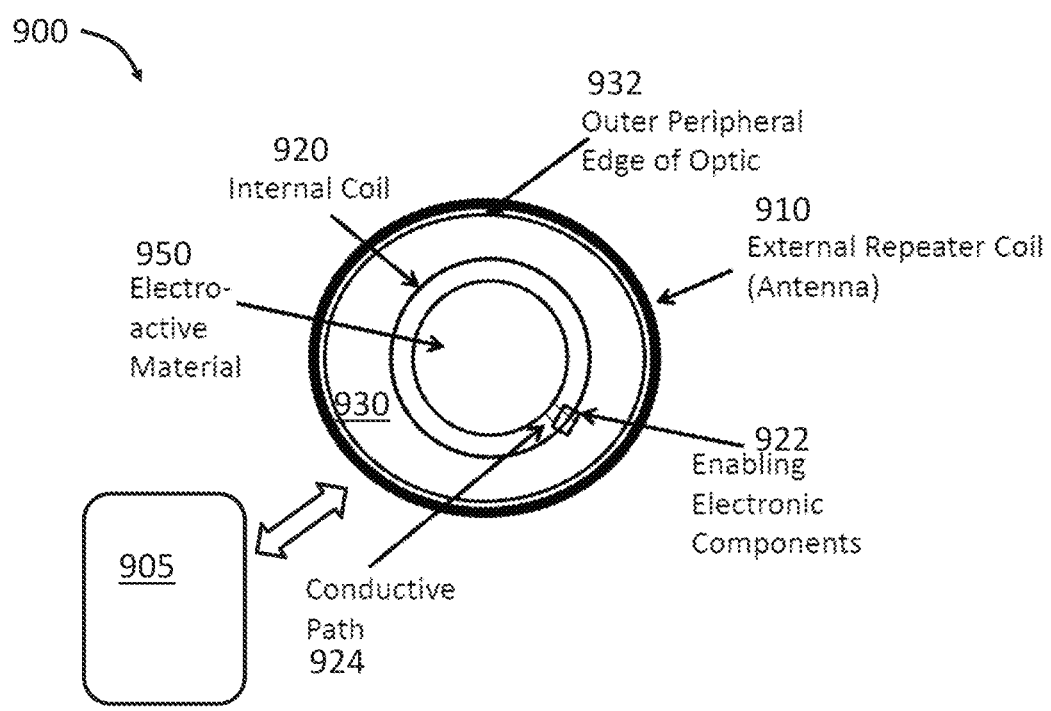
FIG. 9 shows a schematic of a contact lens including a repeater coil and an internal coil in concentric configuration.

FIG. 9 shows a schematic of an ophthalmic system 900 (e.g., a contact lens or an intra-ocular lens) including a repeater coil 910 and an internal coil 920 in a concentric configuration. The system 900 includes a lens 930 having an outer edge 932. A first coil 910 (also referred to as an external coil, or a repeater coil, or an antenna) is disposed on the outer edge 932 of the lens 930 to receive wireless energy from an external device 905. The first coil 910 can also transmit signals or data to the external device 905 (i.e., functioning as an antenna). Within the outer edge 932, a second coil 920 (also referred to as an internal coil) is coupled to the lens 930 to receive energy transmitted by the first coil 910. The first coil 910 and the second coil 920 are substantially concentric with each other to increase the efficiency of energy transfer between the two coils 910 and 920.

The system 900 also includes an electro-active element 950 including an electro-active material at the center of the lens 930. The electro-active element 950 is powered by the second coil 920 via an internal electronic 922, which can include, for example, voltage controller, frequency modulator and/or demodulator, or any other electronics.

In one example, the electro-active element 950 is embedded within the lens 930. In another example, the electro-active element 950 is disposed on the front surface and/or the back surface of the lens 930. In yet another example, part of the electro-active element 950 can be disposed on one surface of the lens 930 while another part of the electro-active element 950 can be disposed on the other surface of the lens 930. For example, the electro-active element can include a liquid crystal layer disposed between two transparent electrodes. The liquid crystal can be embedded within the lens 930 and each of the two electrodes can be disposed on a respective surface of the lens 930 (i.e., one electrode on the front surface and the other electrode on the back surface).

Figure 10D:
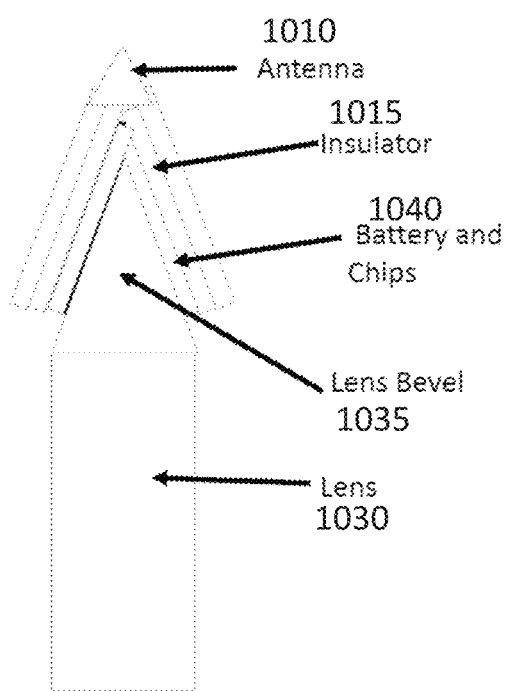

FIGS. 10A-10D illustrate an ophthalmic system 1000 including a coil (e.g., the first coil 110 in FIG. 1) and a battery disposed between a lens and a lens frame. FIG. 10A shows a front view of the system 1000 including a lens 1030 disposed within a lens frame 1032. FIG. 10B shows a side view of the system 1000. FIG. 10C shows a magnified view of the portion of the system 1000. The magnified view shows that a first coil 1010 (also referred to as an antenna), which is part of a repeater, disposed between the lens 1030 and the lens frame 1032.

FIG. 10D shows a further magnified view. In this view, the lens 1030 has a bevel portion 1035 having a wedge shape. A battery 1040 (or any other energy storage element) is disposed on the wedge surface of the lens bevel 1035. An insulating layer 1015 is disposed on the battery 1040. The first coil 1010 is disposed substantially at the tip of the wedge surface of the lens bevel 1035 and above the insulating layer 1015, which insulates the first coil 1010 from the battery 1040.

The system 1000 integrates the first coil 1010 and the battery 1040 into the space between the lens 1030 and the lens frame 1032. This can securely fix the first coil 1010 and the battery 1040 into the system 1000 without using any area on the lens 1030, thereby reducing interference with the vision of the wearer.

Methods of Operating Ophthalmic Devices with Wireless Charging

Figure 11:
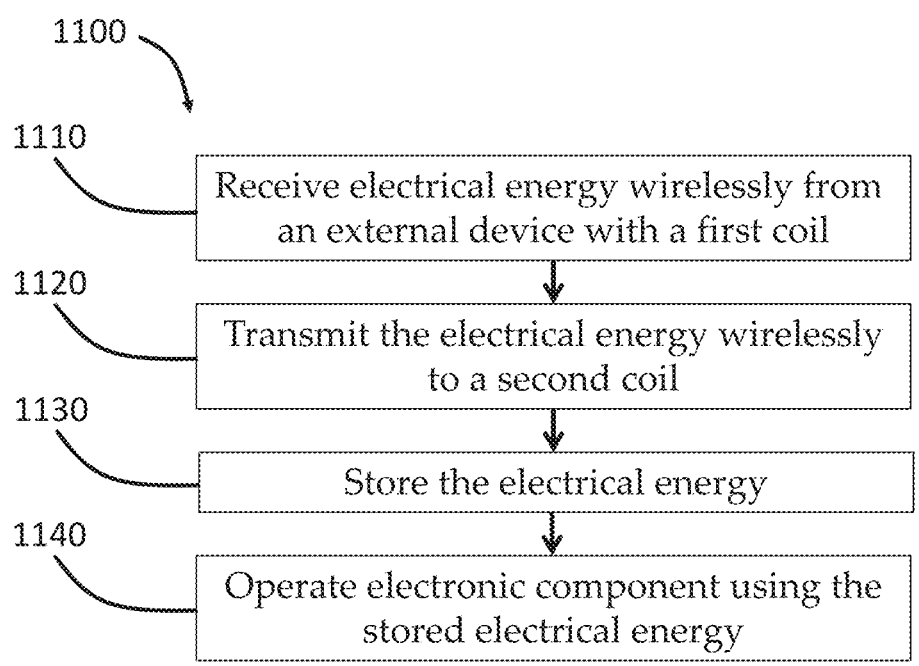
FIG. 11 illustrates a method of operating an ophthalmic device with wireless charging.

FIG. 11 illustrates a method 1100 of operating an ophthalmic device with wireless charging. The ophthalmic device can include any of the ophthalmic devices and systems described above (see, e.g., FIGS. 1-10D).

At step 1110 in the method 1100, a first coil in the ophthalmic device is used to receive electrical energy wireless from an external device. This energy transfer can be achieved using, for example, inductive charging, magnetic resonance charging, ultrasound energy transfer, microwave energy transfer, WiFi, Bluetooth, or any other wireless energy transfer techniques known in the art. At step 1120 in the method 1100, the first coil transmits the received energy to a second coil in the ophthalmic device. The energy transfer between the first coil and the second coil can be achieved using inductive charging and/or resonant charging as described above. In one example, the first coil can function as a repeater to relay the electrical energy from the external device to the second coil. In another example, the first coil can function as a resonator to transfer the energy to the second coil.

At step 1130 in the method 1100, the electrical energy received by the second coil is stored in an energy storage element. Examples of energy storage element include, but are not limited to, rechargeable battery, thin film battery, capacitor, and supercapacitor, among others. Alternatively, the energy storage element can be optional and the ophthalmic device can be powered directly by the second coil.

At step 1140 in the method 1100, the electronic component consumes the electrical energy stored in the energy storage element or directly from the second coil. In one example, the electronic component can change its transmission in response to a voltage applied to the electronic component. In this case, the ophthalmic device can include a photo detector to monitor ambient light level so as to control the voltage applied to the electronic component. In another example, the electronic component can change its refractive index (and optical power) in response to a voltage applied to the electronic component. In this case, the ophthalmic device can include a range finder to measure the distance between the ophthalmic device and an object of interest (i.e., the object which the wearer is interested in viewing) so as to control the voltage applied to the electronic component.

Conclusion

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

Also, various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of" "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:

1. An ophthalmic device comprising:
    a spectacle lens;
    a repeater coil, embedded in the spectacle lens, to receive electrical energy wirelessly from an external device;
    an energy receiving coil, embedded in the spectacle lens, to receive the electrical energy wirelessly from the repeater coil; and
    at least one electronic component, embedded in the spectacle lens, to consume at least a portion of the electrical energy received by the energy receiving coil.

2. The ophthalmic device of claim 1, further comprising:
    an energy storage element, embedded in the spectacle lens and operably coupled to the energy receiving coil, to store the electrical energy received by the energy receiving coil, wherein the at least one electronic component consumes the electrical energy stored in the energy storage element.

3. The ophthalmic device of claim 2, wherein the energy storage element comprises at least one of a rechargeable battery, a capacitor, or a supercapacitor.

4. The ophthalmic device of claim 2, wherein the energy storage element comprises a thin film battery disposed at a periphery of the at least one electronic component.

5. The ophthalmic device of claim 2, wherein the energy storage element comprises an internal coil to receive energy from the energy receiving coil.

6. The ophthalmic device of claim 1, wherein the repeater coil is configured to receive the electrical energy from the external device via magnetic induction.

7. The ophthalmic device of claim 1, wherein the repeater coil is disposed about a perimeter of the spectacle lens, between the spectacle lens and a frame holding the spectacle lens, or on the frame.

8. The ophthalmic device of claim 1, wherein the energy receiving coil is concentric with the repeater coil.

9. The ophthalmic device of claim 1, wherein the energy receiving coil is configured to receive the electrical energy from the external device via magnetic resonance or magnetic induction.

10. The ophthalmic device of claim 1, further comprising:
    frames holding the spectacle lens.

11. The ophthalmic device of claim 1, wherein the spectacle lens has no optical power.

12. The ophthalmic device of claim 1, wherein the at least one electronic component comprises:
    an electro-active element having a transmission that changes in response to an application of a voltage to the electro-active element.

13. The ophthalmic device of claim 1, wherein the at least one electronic component comprises:
    an electro-active element having a refractive index that changes in response to application of a voltage to the electro-active element.

14. The ophthalmic device of claim 13, further including:
    a range finder, operably coupled to the electro-active element, to measure a distance between a wearer of the ophthalmic device and an object of interest,
    wherein the voltage is based at least in part on the distance.

15. The ophthalmic device of claim 1, wherein loops of the energy receiving coil are disposed about a perimeter of the spectacle lens perpendicular to an optical axis of the spectacle lens.

16. The ophthalmic device of claim 1, wherein loops of the energy receiving coil are disposed in a plane containing or parallel to an optical axis of the spectacle lens.

* * * * *